(12) United States Patent
Demaria

(10) Patent No.: US 6,394,625 B2
(45) Date of Patent: May 28, 2002

(54) LIGHT-EMITTING DEVICE AND SUPPORT PILLAR ASSEMBLY

(76) Inventor: Edgardo Dante Demaria, Benito Juarez 3279, Buenos Aires (AR), 1417

(*) Notice: Subject to any disclaimer, the term of this patent is extended or adjusted under 35 U.S.C. 154(b) by 0 days.

(21) Appl. No.: 09/916,680

(22) Filed: Jul. 30, 2001

Related U.S. Application Data

(63) Continuation of application No. PCT/EP00/00610, filed on Jan. 27, 2000.

(51) Int. Cl.[7] .............................. F21V 21/00; F21S 8/00; H01R 13/60
(52) U.S. Cl. .................. 362/249; 362/396; 362/152; 362/410; 362/431; 362/278; 362/320; 362/224; 362/225; 362/581; 439/576
(58) Field of Search ................................ 362/249, 219, 362/396, 234, 253, 576, 152, 240, 410, 431, 278, 320, 224, 225, 581; 439/576

(56) References Cited

U.S. PATENT DOCUMENTS 807,189 A * 12/1905 McCarthy .................... 362/249
1,096,457 A * 5/1914 Ravlin .......................... 362/410
4,903,179 A   2/1990 Lin ............................... 362/184
5,345,531 A   9/1994 Keplinger et al. ........... 385/102
5,528,477 A * 6/1996 Carmo ......................... 362/396

FOREIGN PATENT DOCUMENTS

WO         0805304 A2    11/1997
WO         WO98/32359     7/1998

* cited by examiner

Primary Examiner—Alan Cariaso
Assistant Examiner—Bao Truong
(74) Attorney, Agent, or Firm—Jacobson Holman, PLLC

(57) ABSTRACT

The invention relates to a combination of a light-emitting tubular device (25) and a support pillar (15) for retaining and electrically connecting the device, the light emitting device comprising a translucent outer sheath comprising braided filaments (8) and a light emitter (2) arranged within the tubular hollow body (1), the combination comprising retaining hooks (20, 36, 41) for retaining the device in the pillar, and power connectors (19, 26, 38, 43) for connecting the device and the pillar and providing power to the light emitter. The invention also relates to a light emitting device and a pillar for mounting the device with purposes of delimiting pedestrians walking areas, performing towing functions, rescuing activities, signaling.

18 Claims, 5 Drawing Sheets

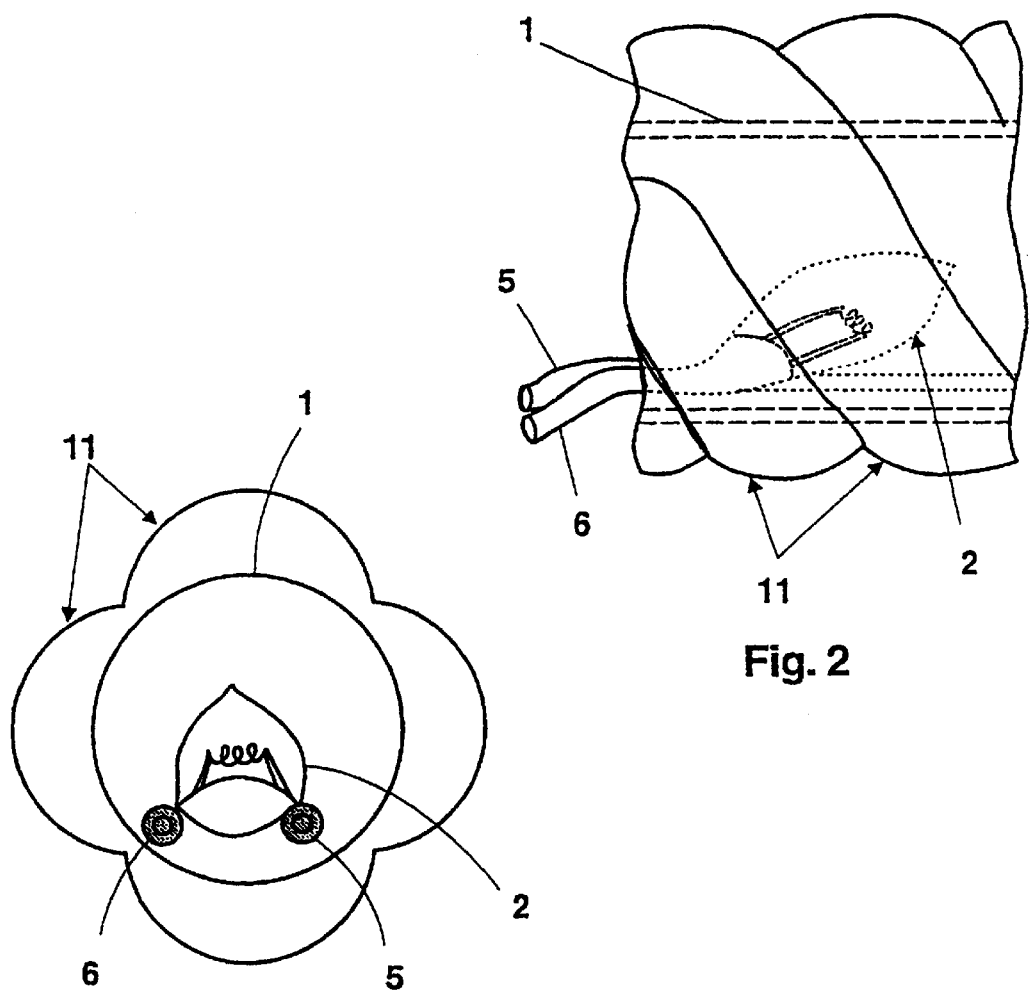
Fig. 2
Fig. 3
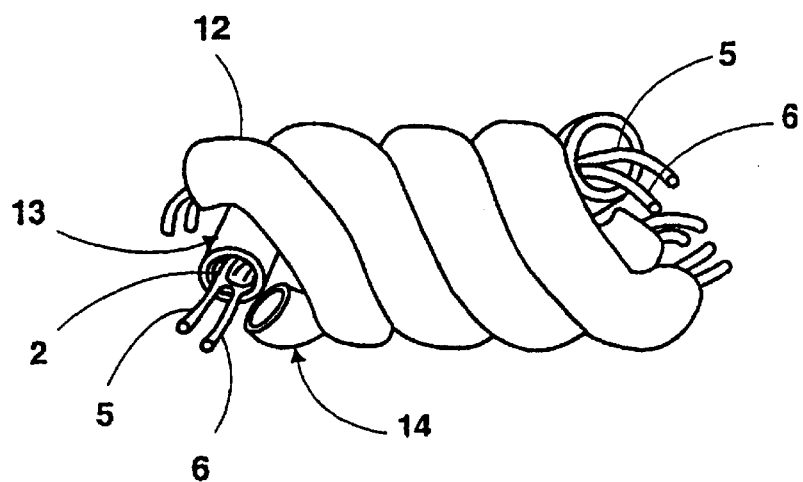
Fig. 4

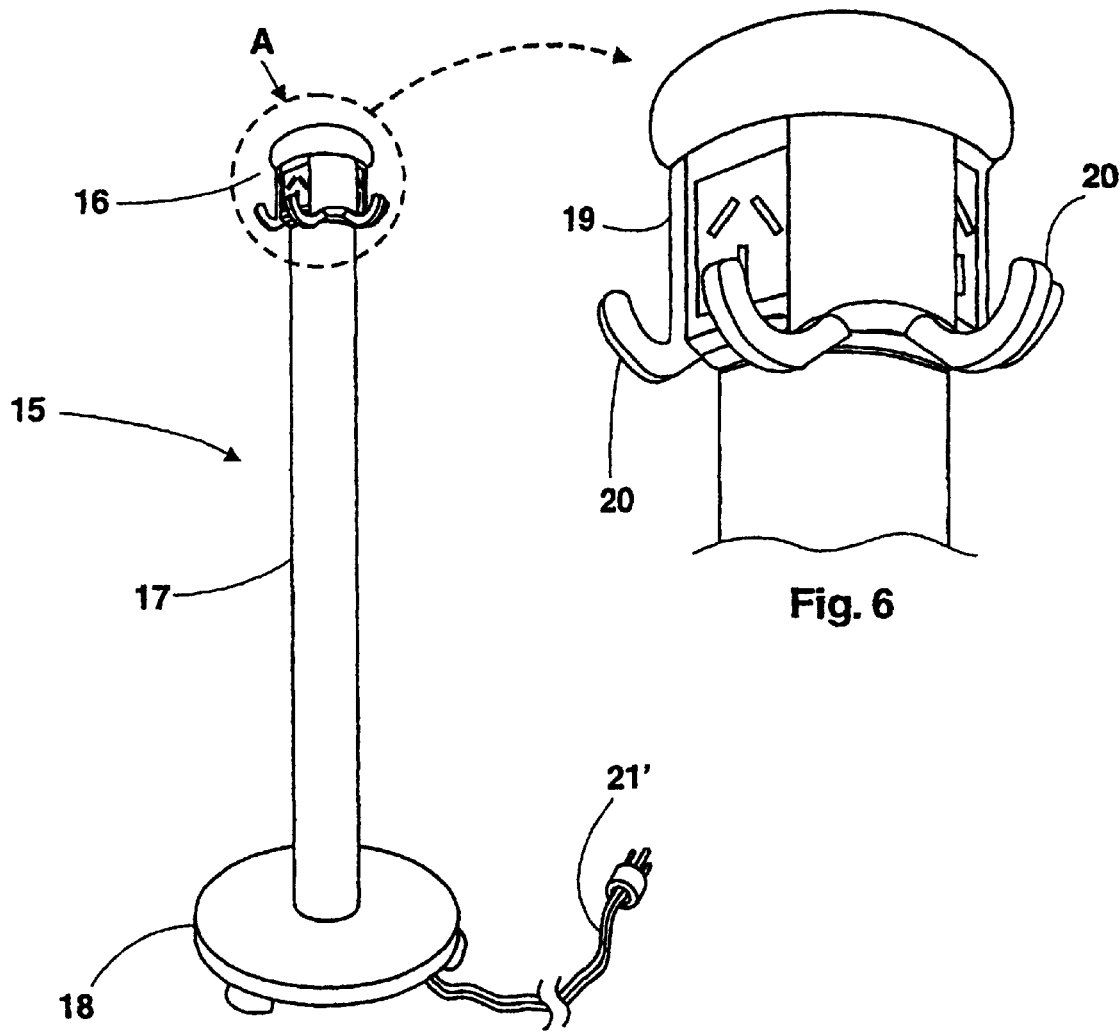
Fig. 5
Fig. 6
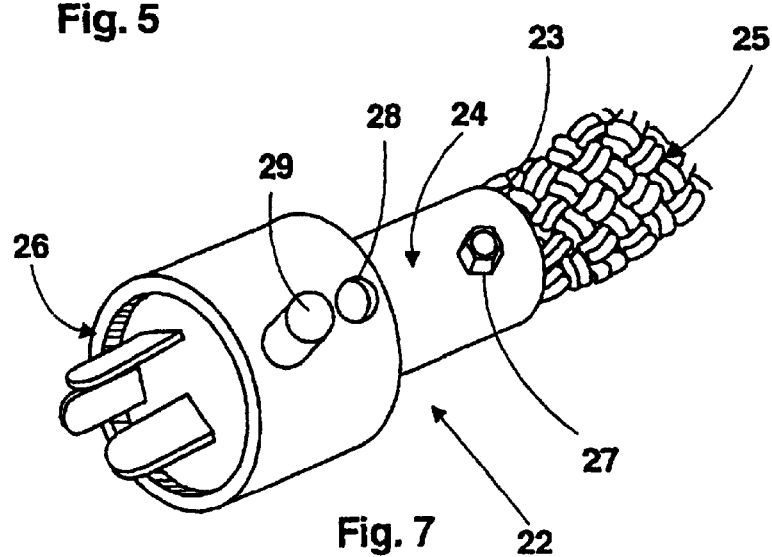
Fig. 7

LIGHT-EMITTING DEVICE AND SUPPORT PILLAR ASSEMBLY

This is a continuation application of International Application No. PCT/EP00/00610, filed Jan. 27, 2000.

BACKGROUND OF THE INVENTION

1. Field of the Invention

The present invention relates to an assembly combining a light device and a support stand or pillar and, more particularly refers to a combination of a tubular flexible light-emitting device and a support or mounting pillar, the combination being preferably applicable to decorative purposes, to delimiting of walking areas, to rescuing activities, signaling, underwater works, boating, towing works, and any other activity wherein a luminous or lighting visible tubular member, such as a rope, cord or cable may be useful for such work, preferably at night, in dark areas, either on land, air and water areas.

According to particular and desired applications the light device may be used alone or in combination with the mounting pillar, however, in towing activities and rescuing, for example, the pillar may be not necessary. The tubular lighting device is made of water resistant and tension resistant materials which make the device capable of being subject to high stresses thus preventing the same and any light emitter arranged within the device from being damaged.

It is to be remarked that the device of the invention is very important for a proper viewing of dangerous and restricted areas wherein the access to persons must be restrained. In other areas, however, the present device and combination is very useful such as in decorative applications, delimiting walking ways, for assisting people to form queues to buying of tickets and entering theatres, sports stadiums, cinemas, etc.

2. Description of the Prior Art

It is well known to provide strips and ropes to delimiting of walking ways in movie theatres and other public spectacles in order to restrict the vehicle entrances and walking areas for spectators. These strips are also used by the police to delimit accident areas and while the same may have reflecting colors and color combinations that make the same visible during day hours these strips and ropes need to be illuminated during night hours by means of special powerful lamps, reflectors, warning lights, flashing lamps, etc.

It is also known to provide chains made of plastic links, with opaque or reflective colors which are applied to the same above mentioned uses but, like the cited marking strips, the same must be illuminated to be visible during night hours. In addition, these chains have insufficient stress resistance which causes the same to be only applicable to decorative purposes during light periods.

Transparent plastic tubes and conduits are also known containing in their interior lights for decorative purposes, for Christmas trees and ornaments, for example. These transparent tubes, however, do not comply well with their purpose of providing a visible and continuous light distribution along the entire length of the tube. The several inner lamps provide for a multiplicity of light spaced apart points that make the tube preferable applicable to decorative purposes but not useful for warning and other activities. Particularly in connection with delimiting large areas, towing works and rescuing, the stress resistance of these conventional tubes is very deficient to comply with the severe safety requirements of these functions.

It is to be remarked that the plastic materials from which the above tubes and conduits are made have no proper molecular orientation and therefore they do not have the desired stress tensile resistance, thus the polymeric tubular element housing the lamps is not resistant enough to be subject to tensile stresses and, In the practice, the tubes are plastically stretched thus transmitting this stretching to the inner lamps and conductors which are broken under this stress.

U.S. Pat. No. 4,903,179 discloses an indoor/outdoor light decoration assembly comprising a number of light strings which are housed in transparent tubular holders. Each tubular holder has a plurality of axially oriented ribs for outwardly shedding the light produced by the inner light string.

Each tubular holder is supported by means of a tubular fixing mount and a pointed ground fixing member. The light strings are connected to a power supply by means of electrical connectors which are located outside the ground fixing member.

Thus, said light decoration assembly has a tubular sheath showing a stress resistance inadequate for light-emitting devices suitable for delimiting public areas for warning purposes. Moreover, said light decoration assembly has electrical connectors which are not protected and are not safe from danger.

Briefly, the strips, chains, tubes and ropes used in hotels, public spectacles, movie theatres, pedestrian ways, construction areas, etc., are visible only during natural light hours, namely in diurnal uses, however they are not visible during the night and need to be illuminated by separate and additional reflectors and lamps. When these strips, chains and ropes are used in highways, roads streets, toll booths, etc., to indicate and delimit dangerous areas, the same may be visible only under the lights of the car approaching the delimited area and may be that the driver, at certain car speed, has not enough time or distance to actuate the brakes and stop the car upon the close warning strips, etc.

In addition to the foregoing some stand devices and supports are known, combined with ropes or extensible strips that are wrapped around an upper head of the stands to delimit walking ways or queues in banks, movie theatres, etc., for guiding the people to the cashiers and ticket sellers. These stands and pillars, however, are not provided with power supplies or electric connectors, and/or light emitters to make the pillars more visible during the night. The pillars neither provide for connection to number displays, signals, electric cleaning devices, vacuum cleaners or any other devices that could be connected to the pillar for a power supply.

It would be therefore convenient to have a light emitting device, a pillar or stand and a combination thereof that would be useful in delimiting areas, walking ways, in performing safety works, etc., not only during natural light hours but also during the night wherein the devices and the combination are translucent and tensile resistant enough for such activities.

SUMMARY OF THE INVENTION

It is therefore one object of the present invention to provide a combination of a light device and a stand, wherein the device comprises an elongated translucent rope housing light emitters and permitting the light from the emitters passing outwardly, uniformly spreading the light along the continuous length of the device to see the device as a warning element, with power supply being provided through the stand to which the device is mounted and connected.

It is still another object of the present invention to provide a luminous system having a proper tenacity necessary for activities wherein important tensile stresses are involved. This tenacity and tensile resistance is achieved by using proper manufacturing techniques and materials, by extruding high density polyethylene, or other polymers, monofilaments and multi-filaments, by orienting their molecules through the stretching of the material in a plastic condition to obtain the desired tenacity. The system may be provided in a plurality of desired colors according to the activity to be performed, with safety purposes, for guiding pedestrians and vehicles, as well as for decorative purposes, outdoor or indoor, regardless the intensity of the available light, either natural or artificial.

It is a further object of the present invention to provide a combination of a light-emitting tubular device and a support pillar for retaining and electrically connecting the device, the light emitting device comprising a tubular translucent sheath comprising braided filaments and at least one light emitter arranged within the tubular sheath, the combination comprising retaining hooks for retaining the device in the pillar, and a power connector for connecting the device and the pillar and providing power to the light emitter. The invention also relates to a light emitting device and a pillar for mounting the device with purposes of delimiting pedestrians walking areas, performing towing functions, rescuing activities, signaling and the like.

It is even another object of the present invention to provide a combination of a light-emitting tubular device and a support pillar for retaining and electrically connecting the device, wherein the light emitting device comprises a translucent outer sheath comprising braided filaments and a light emitter arranged within the tubular hollow body, and wherein the combination comprises retaining means for retaining the device in the pillar, and power connecting means for connecting the device and the pillar and providing power to the light emitter.

It is even another object of the present invention to provide a light-emitting tubular hollow device comprising a translucent outer sheath comprising braided, woven, knitted or twisted filaments, at least one light emitter arranged within the tubular hollow device, retaining means for retaining the device in a support pillar, and power connecting means for connecting the device and the pillar and providing power to the at least one light emitter, the outer sheath being water proof.

It is a further object of the present invention to provide a support pillar for mounting of at least one light-emitting tubular device, the pillar comprising an upper head, a lower base, a hollow body, retaining means at the head of the pillar for retaining the device in the pillar, and power connecting means for connecting the device to the pillar and providing power to the light emitting device.

The above and other objects, features and advantages of this invention will be better understood when taken in connection with the accompanying drawings and description.

BRIEF DESCRIPTION OF THE DRAWINGS

The present invention is illustrated by way of example in the following drawings wherein:

FIG. 2 shows a side elevation, partially cross-sectional view of a length of the light-emitting device of the invention;

FIG. 3 shows a cross-sectional view of the device of FIG. 1;

FIG. 4 shows a side elevation, partially cross-sectional view of a length of the light-emitting device of the invention;

FIG. 5 shows a side elevation view of a pillar according to the invention;

FIG. 6 shows a side elevation of an upper head of the pillar, the illustrated portion being the one encircled in detail A of FIG. 5;

FIG. 7 shows a perspective view of an end of the light emitting device according to another embodiment of the invention;

DESCRIPTION OF THE PREFERRED EMBODIMENTS

Figure 1:
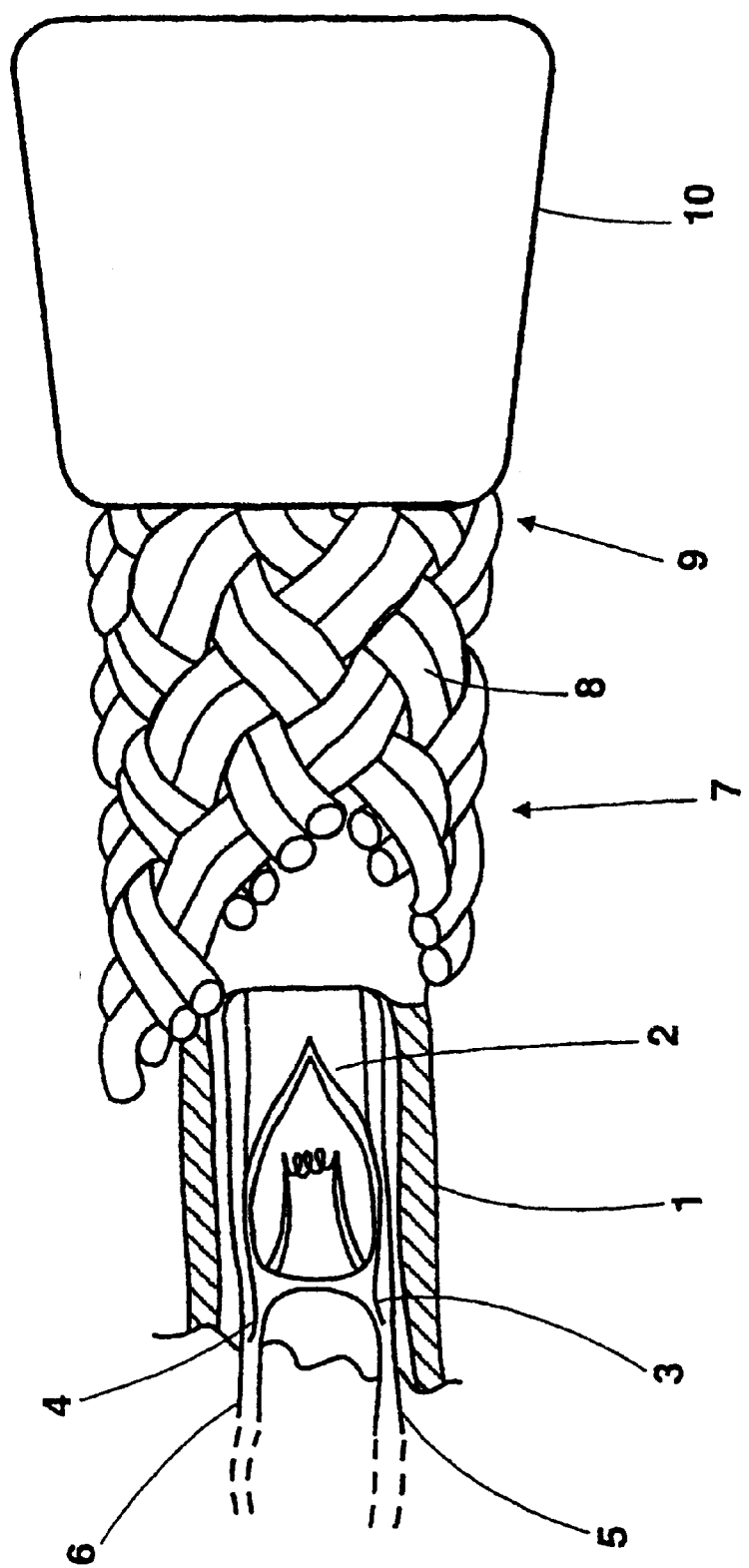
FIG. 1 shows a side elevation, partially cross sectional view of an end of the light emitting device according to a first embodiment of the invention.

Now referring in detail to the drawings it may be seen from FIGS. 1 and 2–4 some portions of the light emitting device according to the present invention, wherein FIG. 1 shows an end of the elongated device according to one embodiment of the invention and FIGS. 2–4 shows length portions and cross-section of another device embodiment. The light device of the invention is comprised of an elongated transparent or translucent tubular body, preferably comprising an inner tube 1 within which a light emitter 2 is housed, the light emitter comprising an incandescent lamp having connecting terminals 3, 4 connected to conductors or cables 5, 6 for supplying electric power to the lamp. The conductors extend along tube 1 and at and end of the tube they are connected to a power source (not illustrated) as it will be later explained. While the light emitter is illustrated as a micro-lamp, preferably a 12V, 24V, 110V or 220V lamp, the emitter may be a light emitting diode, a neon micro lamp, one or more optic fibers, or any other light emitter available in the market.

Tube 1, according to an embodiment of the invention, is made of a plastic material, a polymer for example, flexible and tensile resistant, entirely transparent, like a crystal, or translucent, as well as it may be pigmented to be of any desired color. Tube 1 is covered by a tubular outer translucent sheath formed by braided, twisted, woven or knitted elongated elements, preferably filaments 8 made of any proper material and any color according to the desired application of the device. Thus, the colors may be international coded colors, for warning purposes, for indicating danger situations, etc. The elected colors must allow the light from lamp 2 to pass through the sheath and the inner tube will cause the light to multiply reflect within the tube in order to obtain a continuous and uniform generation of light through the tube and the sheath.

The elongated light emitting device of the invention may have one or more ends of which only one end 9 is shown in FIG. 1. End 9 may be terminated or closed by means of a plug 10 and an inner complementary plug (not shown) may also be provided within sheath 7 and on tube 1 to prevent dirty and/or water from entering into tube 1 and contacting the lamp and the conductors. Thus, the device may be water proof and appropriate to be used in outdoor and underwater operations. The provision of electric connecting means and retaining means will be later described to mount the elongated flexible device to stands, walls, pillars, etc. The end of the device opposite to the one illustrated in FIG. 1 may be closed by a similar plug, may be like the one of FIG. 1 or may include any type of connecting means.

While only one lamp 2 has been depicted it is obvious that a plurality of light emitters, like lamp 2, may be arranged, not only close to end 9, but also along the entire length of tube 1, to obtain a uniform and continuous light distribution along the light emitting device. Sheath 7 may be manufactured from extruded materials that are oriented in their plastic condition in order to give the assembly the desired tensile resistant characteristic to prevent the light emitters and conductors from being subject to stresses and exposed to tearing or breaking. Sheath 7 is so resistant that tube 1 may be no necessary and the elongated tubular body of the invented device may consist only of sheath 7 without tube 1.

As it was already remarked the light emitters may be devised as a plurality of optic fibers of the type capable of emitting light by their ends or along the length thereof, which optic fibers may be connected to a light source (not shown) to transmit the light through filaments 8 of sheath 7.

As it is shown in FIGS. 2, 3, lamp 2 is arranged within tube 1 and connected to power supplying cables or conductors 5, 6 and the sheath covering tube 1 consists of filaments 11 which are twisted to form a longitudinal helical arrangement.

According to the illustration in FIG. 4, the inventive light device may comprise a plurality of tubes indicated by 12, 13, 14, manufactured from a flexible plastic material, each tube housing lamps 2 with each lamp being connected to corresponding power conductors 5, 6. In this arrangement the tensile resistance of the assembly is increased by the helical interconnection of the several tubes.

The above described elongated light emitting device of the invention may be manufactured through any suitable method such by extruding monofilament threads, multifilament threads, strips, films and laminated films suitable for being braided or twisted or woven, always the materials being crystalline translucent, or transparent, colored or not, and having tenacity. The filaments, are then braided, twisted, knitted or woven by using conventional machines for forming the same into tubes or sheaths suitable for receiving the light emitters and conductors and capable of being covered by an outer isolating PVC material. Once cut in a desired length the ends of the device length are closed or terminated by plugs, sleeves and the like, in order to prevent dirty, water or any other matter from entering the device, thus isolating the light emitters and conductors from the environment. The location wherein the conductors exit the device may be sealed by thermal shrinkable films, or any plastic seal. Then, electric connecting means and retaining means may be connected to the end termination to allow the device to be connected to walls, stands or pillars as will be disclosed below.

FIGS. 5, 6 shows a preferred support stand or pillar 15 for mounting the invented device according to a desired layout and application. Pillar 15 includes an upper head 16, a vertical body 17 and a base 18. FIG. 6 shows in detail head 16 encircled in the circle A shown in phantom lines in FIG. 5. Head 16 includes electric connecting means preferably comprising at least one female connector 19, preferably four connectors 19, for providing power to the device, the connector being located at a side wall of the head. Head 16 also provides for retaining or mounting means comprising at least one upwardly extending hook 20, and preferably 8 hooks 20, two hooks at each side of the head. The pillar is hollow in order to allow conductors 21' run along the pillar and exiting at base 18 in order to be connected to any available power source for feeding electric power to connectors 19.

FIG. 7 shows a terminal at an end of the elongated light device 25 according to one embodiment of the invention. Terminal 22 may be a plug having an access defined in a housing portion 24 for receiving end 9 of device 25. In addition, terminal 22 has opposite to access 23 a male connector 26 having a configuration similar to a conventional three (with earth connection) or two pin connector. The female connectors 19 and male connectors 26 may be of any suitable type, even a conventional type available at the market.

Terminal 22 includes two fastening means, like a bolt-nut fastener 27 and a crimp or rivet fastener 28 for firmly retaining together elongated device 25, terminal 22 and male connector 26. Terminal 22 has at the end wherein male connector 26 is arranged at least one radial prong or projection 29, preferably two opposite radially extended projections 29, which permit the device to be retained to pillar 15, in hooks 20 at head 16 for example, and also to permit an earth electric discharge for safety purposes.

Figure 8:
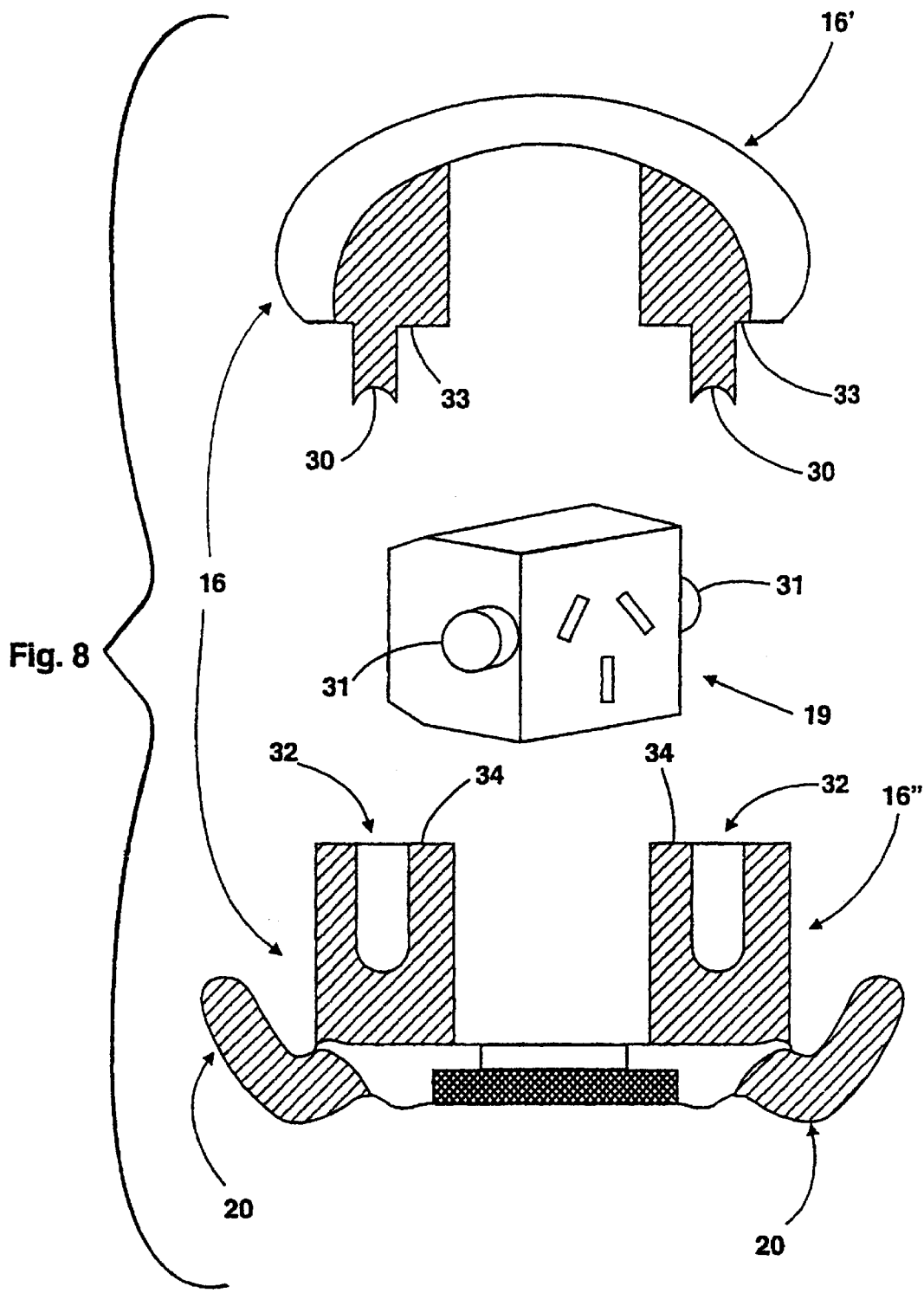
FIG. 8 shows an exploded partially cross-sectional view of the upper head of FIG. 6.

FIG. 8 shows female connector 19, in a perspective view, to illustrate the way this connector is mounted between an upper part 16' and a lower part 16" of head 16. Connector 19 comprises a block including opposite extending side pins 31 that are received in corresponding cavities 32 of the head lower part. The head upper part includes corresponding pending projections 30, with curved ends 30 to rest against pins 31 and retain pins 31 within cavities 32. Upper parts 16' and 16" have corresponding resting seat surfaces 33, 34 to allow upper and lower parts to seat against each other. When connector 19 is retained between head parts 16' and 16" the configuration of ends 30, pins 31 and cavities 32 allow the connector to pivotally move around pins 31 in order to avoid a stiff connection and prevent the connection between male connector 26 and female connector 19 to be exposed to torsion or flexion that could subject the connection to breaking, conductors cutting, etc. at terminal 22. A particular feature of head 16 is that upper part 16' may be made in chromium-plated metal material, gold-plated material, polished material, translucent plastic material to house a lamp, for example, to be lighted on when the device is connected to the pillar, for example.

Figure 9:
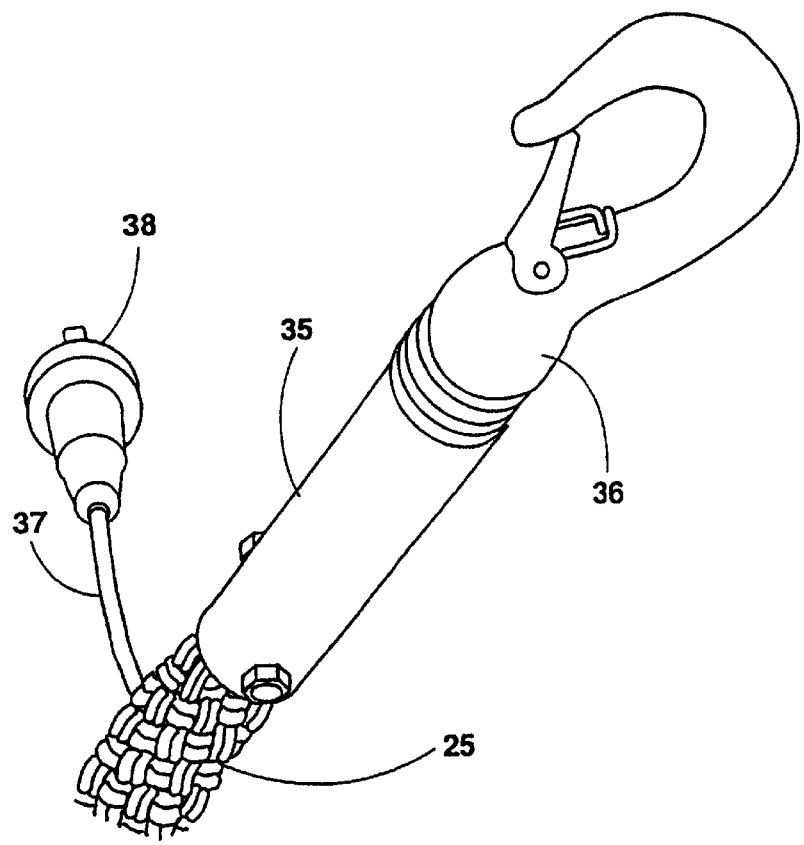
FIG. 9 shows a perspective view of an end of the light emitting device according to another embodiment of the invention.
Figure 10:
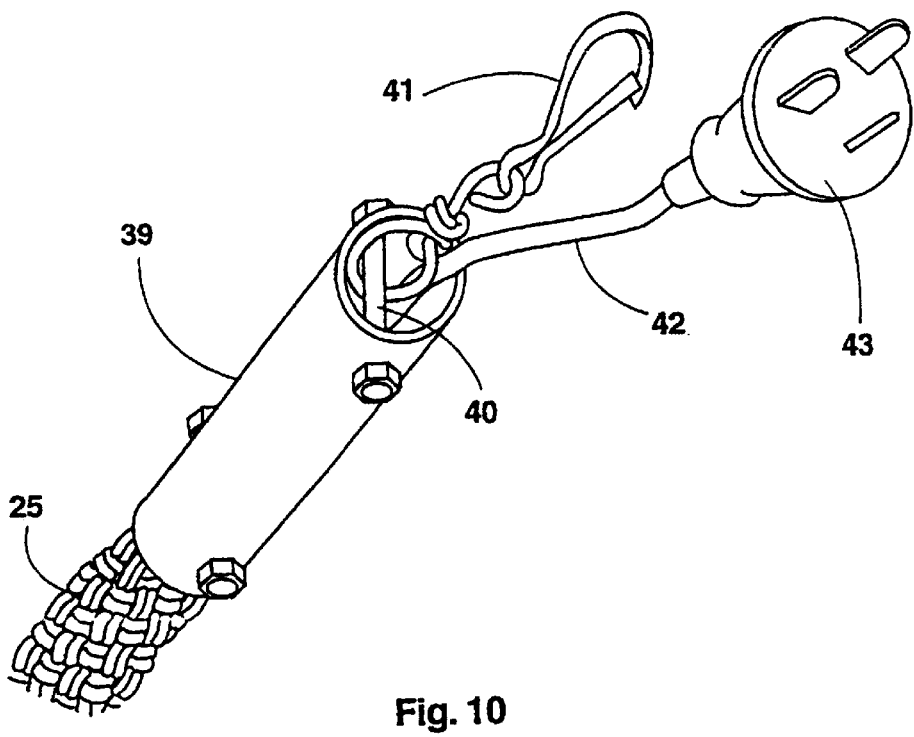
FIG. 10 shows a perspective view of an end of the light emitting device according to another embodiment of the invention.

FIGS. 9, 10 show alternative embodiments wherein the retention of the device to the pillar is obtained by different means. The hook means for retention of the device are in this case designed for industrial activities or towing or rescuing activities, for example. More particularly, FIG. 9 shows the lighting device 25 coupled to a terminal, for example a sleeve 35 having a safety hook or spring shackle 36 which is threaded to the terminal sleeve. This terminal may also be devised as an only one forged or cast piece, with the retaining means, such as the hook being integral to the piece. The threaded connection may also be replaced by cross bar passing through the sleeve and the hook. Conductor 35 extends along device 25 and exit the tubular body of the device through the braided filaments to be terminated in a male connector 38 capable of being electrically connected to female connector 19 of pillar 15. This male connector may be of any known type, including the car lighters type to make the device connectable in other pattern configurations and other applications which are considered within the scope of the present invention.

FIG. 10 differs from FIG. 9 in that a terminal 39 is shown, wherein terminal 39 has a first end receiving the elongated lighting device 25 as it was already described in connection to FIG. 7, for example, and a second end having a crossbar 40 to which retaining means, such as an elastic safety hook or shackle 41, is connected, the retaining means being for connecting device 25 to pillar 15. For this connection purpose pillar 15 may have retention rings in replacement of hooks 20. In this embodiment, shown in FIG. 10, a conductor extension 42 exits device 25 through sleeve 39 and is connected to a male electric connector 43 for connecting to female connector 19 of pillar 15.

The above mentioned terminals 22, 35 and 39 may be manufactured in a variety of materials, such as plastics, metals, woods, etc., each the terminals being configured as an integral sleeve, or a split sleeve that may be assembled around the corresponding end of device 25. The thickness of the terminal may also vary according to the needs, to provide, for example, a threaded portion like in the embodiment of FIG. 9 wherein the hook or shackle 36 is threadably received in a portion of terminal 35. The terminal may also be drilled to received a cross pin or key.

Briefly, the luminous or light emitting device of the invention, as well as the pillar for mounting and electrically connecting the same in desired applications solve all the above mentioned drawbacks of known ropes, strips, chains, in any of the foreseen applications, either for diurnal or nocturnal application, in access restricted areas, in guiding ways for vehicles and persons, in signaling, in construction areas, in parking areas, in toll booths for roads and highways, in accesses to stairways, in underground ways, tunnels, mining, in underwater activities, etc., complying in all the cases with the requirements of the activity in which is applied.

While preferred embodiments of the present invention have been illustrated and described, it will be obvious to those skilled in the art that various changes and modifications may be made therein without departing from the scope of the invention as defined in the appended claims.

What is claimed is:

1. A light-emitting tubular device comprising an outer translucent tubular sheath and at least one light emitter arranged within said tubular sheath, retaining means retaining said tubular device in a support pillar, and power connecting means providing power to said at least one light emitter, characterized in that said tubular sheath comprises braided elongated elements for making said tubular device tension stress resistant and flexible, and said power connecting means electrically connect said tubular device and said support pillar.

2. The light-emitting tubular device according to claim 1, wherein a translucent hollow tube is arranged within said tubular sheath and said at least one light emitter is located within said tube.

3. The light-emitting tubular device according to claim 1, wherein said at least one light emitter is an incandescent lamp.

4. The light-emitting tubular device according to claim 1, wherein said at least one light emitter is a light emitter diode.

5. The light-emitting tubular device according to claim 1, wherein said at least one light emitter is a neon lamp.

6. The light-emitting tubular device according to claim 1, wherein said at least one light emitter is connected to power feeding conductors extending along the tubular device.

7. The light-emitting tubular device according to claim 2, wherein the tube and the tubular sheath are flexible and tension stress resistant.

8. The light-emitting tubular device according to claim 2, wherein the tube and the tubular sheath are waterproof.

9. The light-emitting tubular device according to claim 1, wherein the tubular device is waterproof.

10. The light-emitting tubular device according to claim 1, wherein the power connecting means comprise at least one female connector arranged in an upper head of the pillar, the female connector being connected to power conductors extending along the pillar and exiting the pillar at a base thereof.

11. The light-emitting tubular device according to claim 10, wherein the retaining means comprise at least one hook at the head of the pillar and close to said female connector.

12. The light-emitting tubular device according to claim 10, wherein the power connecting means also comprise a terminal connector at at least one end of the tubular device, the terminal connector including a power male connector and at least one radial projection forming part of said retaining means.

13. The light-emitting tubular device according to claim 10, wherein the power connecting means also comprise a male connector at at least one end of the tubular device and connected to power conductors exiting the at least one end of the tubular device through a terminal sleeve fixed to the one end, said sleeve including a crossbar connected to a safety hook forming part of the retaining means for retaining said at least one end to the head of the pillar.

14. The light-emitting tubular device according to claim 10, wherein the power connecting means also comprise a male connector at at least one end of the tubular device and connected to power conductors exiting the at least one end of the tubular device through the tubular sheath, said one end including a terminal sleeve threadably receiving a safety hook forming part of the retaining means for retaining said at least one end to the head of the pillar.

15. The light-emitting tubular device according to claim 1, wherein said at least one light emitter is an optic fiber.

16. The light-emitting tubular device according to claim 1, wherein the elongated braided elements are braided, twisted, woven or knitted filaments.

17. An assembly combination of a light-emitting elongated tubular device and a support pillar, the tubular device comprising an outer translucent tubular sheath and at least one light emitter arranged within said tubular sheath, retaining means retaining said tubular device in said support pillar, and power connecting means providing power to said at least one light emitter, characterized in that said tubular sheath comprises braided elongated elements for making said tubular device tension stress resistant and flexible, and said power connecting means electrically connect said tubular device and said support pillar.

18. The assembly according to claim 17, wherein the pillar comprises an upper head, a lower base, and a hollow body, the retaining means being placed at the head of the pillar for retaining the tubular device in the pillar, and the head including the power connecting means for electrically connecting the tubular device to the pillar and providing power to the light emitting tubular device.

* * * * *